United States Patent [19]

Valstyn

[11] Patent Number: 5,436,779

[45] Date of Patent: Jul. 25, 1995

[54] INTEGRATED YOKE MAGNETORESISTIVE TRANSDUCER WITH MAGNETIC SHUNT

[75] Inventor: Erich P. Valstyn, Los Gatos, Calif.

[73] Assignee: Read-Rite Corporation, Milpitas, Calif.

[21] Appl. No.: 220,486

[22] Filed: Mar. 31, 1994

[51] Int. Cl.⁶ .................... G11B 5/147; G11B 5/127
[52] U.S. Cl. .................... 360/113; 360/126; 360/125
[58] Field of Search ............ 360/113, 114, 125, 126; 324/252; 338/32 R

[56] References Cited

U.S. PATENT DOCUMENTS

| | | | |
|---|---|---|---|
| 4,819,107 | 4/1989 | Bolt | 360/121 |
| 4,843,507 | 6/1989 | Schewe et al. | 360/125 |
| 5,095,397 | 3/1992 | Nagata et al. | 360/113 |
| 5,097,371 | 3/1992 | Somers | 360/113 |
| 5,111,352 | 5/1992 | Das et al. | 360/126 |
| 5,225,141 | 10/1993 | Valstun et al. | 360/113 |

Primary Examiner—Stuart S. Levy
Assistant Examiner—William R. Korzuch
Attorney, Agent, or Firm—Nathan N. Kallman

[57] ABSTRACT

A thin film read-write magnetic head includes first and second adjacent magnetic layers forming a magnetic circuit path with a transducing gap, a flux sensing element disposed in the plane of one of the magnetic layers, at least one magnetic shunt valve member disposed around the flux sensing element, the valve member being disposed in the same plane as the one of the magnetic layers in which the sensing element is disposed. A conductor is electrically connected to the flux sensing member and magnetically coupled to the shunt valve member to apply a magnetic field to the shunt valve member to magnetically control the shunt valve member.

11 Claims, 4 Drawing Sheets

INTEGRATED YOKE MAGNETORESISTIVE TRANSDUCER WITH MAGNETIC SHUNT

CROSS-REFERENCE TO RELATED APPLICATIONS

Copending application Ser. No. 08/103,669, filed Aug. 10, 1993, and assigned to the same assignee as the present application, discloses a transducer for use in magnetic tape devices in which the transducer employs a shunt around a magnetoresistive (MR) or Hall effect read element during writing.

U.S. Pat. No. 5,255,141, assigned to the same assignee as the present application, discloses a transducer in which a shunted flux-sensing read element such as a MR or a Hall effect element is located in the magnetic circuit of a ring-type write head.

BACKGROUND OF THE INVENTION

1. Field of the Invention This invention relates to read/write magnetic transducers, and relates more particularly to such transducers employing MR or Hall effect read elements.

2. Description of the Prior Art

Thin film magnetic heads or transducers may employ separate elements for recording and reading data. As is well known, thin film magnetic write heads comprise a first magnetic layer, designated as P1, and a second magnetic layer, designated as P2. The P1 and P2 layers make contact at a back closure to form a magnetic yoke having a continuous magnetic path with a write transducing gap between the P1 and P2 layers. During the recording or write mode, electrical signals representative of signals to be recorded are supplied to the transducer and are recorded as magnetic flux signals on an associated surface of a magnetic disk or tape. During the read mode, the recorded magnetic signals are sensed by the read portion of the transducer to produce electrical signals which are read out for further utilization.

It is known that either MR or Hall effect devices may be used as flux sensing elements in thin film heads to implement the readout function. In a conventional recording head having an MR read transducer, the write and read sections of the head must be carefully aligned with each other to effectuate proper track following for writing and reading. The lateral region of sensitivity, which is the read width, is determined by the length of the MR transducer. This transducer length must be approximately equal to the width of the data track to be read. For small track widths, Barkhausen noise is relatively high as compared to signal amplitude because the domain walls that cause such noise are located predominantly at the ends of the MR transducer.

In prior art MR heads, the MR element and a biasing element, which is either a conductor or a magnetic layer, are positioned in a gap formed between two shield elements. An insulating layer that separates the MR element from the shields must be thick enough to insure that there are no pin holes that would cause electrical contact between the shield elements and the MR element.

A further major problem associated with a conventional MR head is the undesirable generation of thermal noise spikes which occur when the magnetic head makes contact with asperities which protrude from the surface of the magnetic recording medium.

Another problem associated with a conventional MR read head is the generation of a voltage pulse which has a shape similar to that generated by an inductive read head, i.e., the voltage is at a maximum when the magnetization transition is at the center of the sensing gap. In order to detect this point in time with sufficient accuracy, the pulse is differentiated and the zero crossover of the differentiated voltage is detected. This required differentiation causes a substantial decrease in signal-to-noise ratio.

As shown in FIG. 1, the above identified prior art U.S. Pat. No. 5,255,141 discloses one embodiment including magnetic layers P1 and P2 which form a magnetic yoke with a transducing gap G therebetween. A back closure 20 is formed by contact between the ends of layers P1 and P2 to form a continuous magnetic path interrupted by the nonmagnetic transducing gap G. A conductive write coil or winding 10 is embedded in an insulating material 12 which is deposited between layers P1 and P2.

An MR sensor 19 having a defined easy axis of magnetization is provided along the magnetic circuit path in an interspace or well between portions P2A and P2B of the central section of the P2 layer. MR sensor 19 is surrounded by an insulating material 21.

A valve conductor 18 is formed between magnetic layers 14 and 16 which are deposited above the insulating layer 21 and the P2 layer. Layers 14 and 16 are in magnetic contact with the P2 layer, thereby forming a continuous flux path for completing the write magnetic circuit. The valve conductor 18 is formed from one or more copper turns with insulation provided between them and layers 14 and 16. Valve conductor 18 and magnetic layers 14 and 16 form a magnetic valve capable of opening and closing the magnetic shunt path provided by layers 14 and 16.

During the write mode, a track having a width substantially equal to the total width of the transducing gap G is recorded. In the write mode, the valve conductor 18 is not energized so that the signals representing information to be recorded bypass MR element 19 and are directed through the magnetic branches 14 and 16 that surround valve conductor 18. The write signals are transduced at nonmagnetic gap G and recorded on a storage medium.

During the read mode, a current is applied to valve conductor 18 to magnetically saturate layers 14 and 16. When magnetic flux from the recorded medium enters one of the pole tips of the P1 and P2 layers, read element 19 senses the flux as a readout signal as the flux traverses the MR gap. The read efficiency of the head is determined by the ratio of the MR sensor gap length S to valve gap length V.

SUMMARY OF THE INVENTION

The present invention relates to a device similar to that disclosed in the above identified U.S. Pat. No. 5,255,141, but one in which the shunt valve, or valves, are located in essentially same plane as the MR sensing element, i.e., they by either the P1 or P2 layer.

DESCRIPTION OF THE PREFERRED EMBODIMENT

Figure 1:
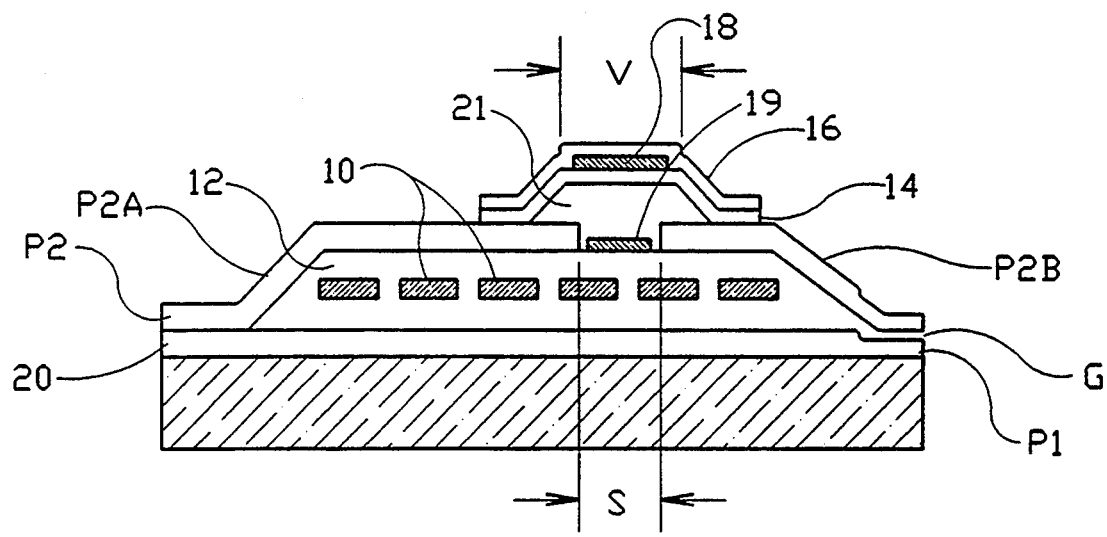
FIG. 1 is an elevational cross sectional view of one embodiment of the prior art device of U.S. Pat. No. 5,255,141 discussed above.
Figures 2A, 2B:
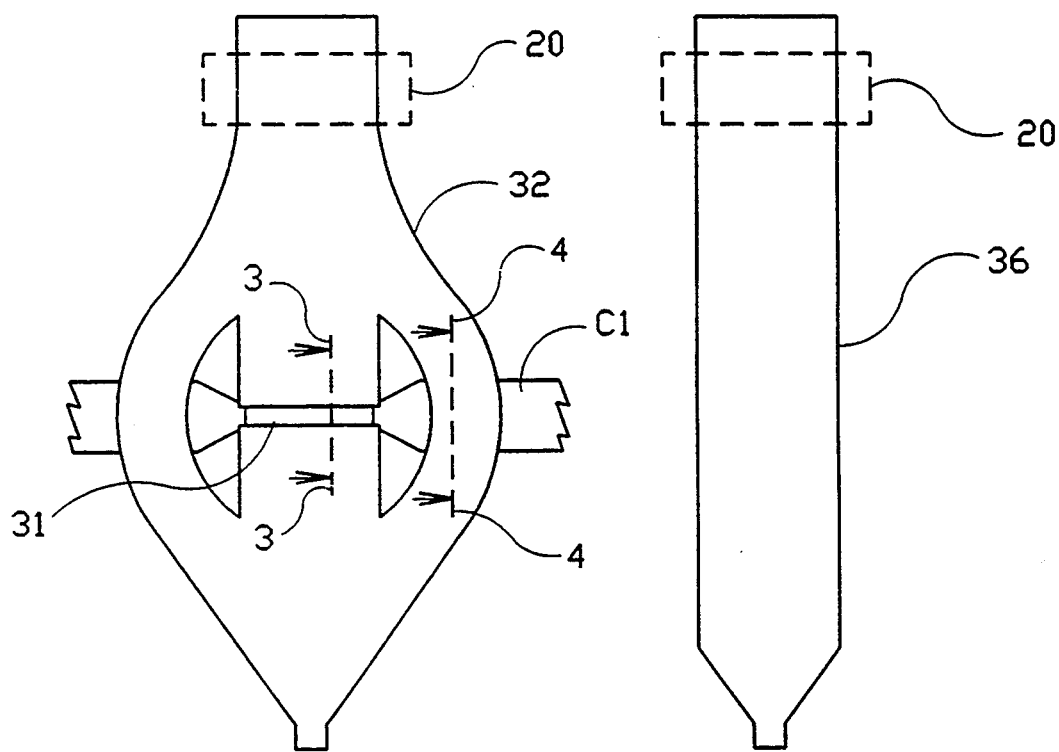
FIG. 2A is a plan view of one embodiment of the present invention showing the P1 layer and MR sensor.
FIG. 2B is a plan view of the P2 layer of one embodiment of the present invention.

Referring to the plan view of FIG. 2A, the structure of this invention includes a P1 layer 32 having a MR sensing element 31 (see FIG. 6) disposed in a gap in a central section of P1 layer 32. In the preferred embodiment of the invention, as shown in FIG. 2A, the P1 member 32 has a symmetrical configuration, with a central section containing MR sensing element 31 and surrounding, spaced sections, each containing a magnetic shunt valve structure, as will be described in more detail below. The structure of FIG. 2A also includes a conductor C1 which is in direct contact with the ends of MR element 31 and which serves to supply a driving current to MR element 31 during a read operation.

FIG. 2B is a plan view of the P2 layer 36 which is disposed on top of P1 layer 32 of FIG. 2A and which, when joined with layer P1, forms a write transducer gap (not shown), at the lower ends of members 32, 36. The upper ends of the P1 and P2 layers are closed at their upper ends by a back closure member 20.

Figure 3:
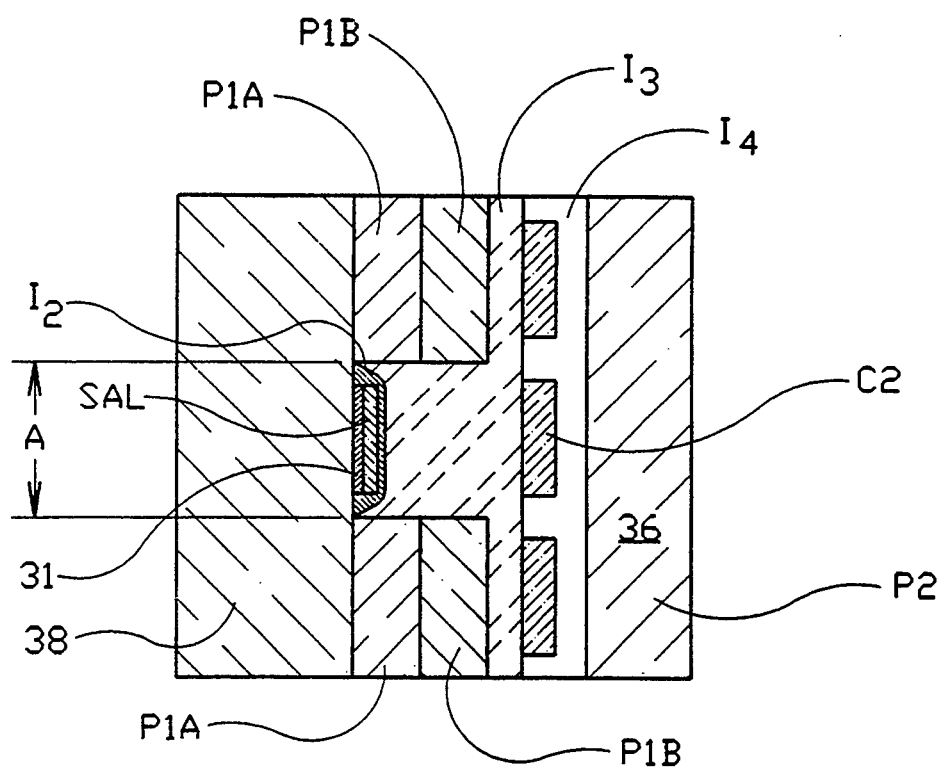
FIG. 3 is a partial cross sectional view of the present invention through plane 3—3 of FIG. 2A showing the relationship of the P1A, P1B, P2 layers and the MR sensor.

Referring to FIG. 3, P1 layer 32 has two segments, P1A and P1B, with a gap of length A in which MR sensor 31 is located. MR sensor 31 in FIG. 3 is overlaid by a soft adjacent layer (SAL) which in turn is surrounded by an insulating layer I2. An insulating layer I3 is disposed in the gap between segments P1A and P1B. One side of insulating layer I3 abuts at one edge thereof a plurality of spaced conductors C2 which form the write coil of the transducer and are surrounded by an insulating layer I4. One surface of insulating layer I4 is in contact with P2 layer 36.

Figure 4:
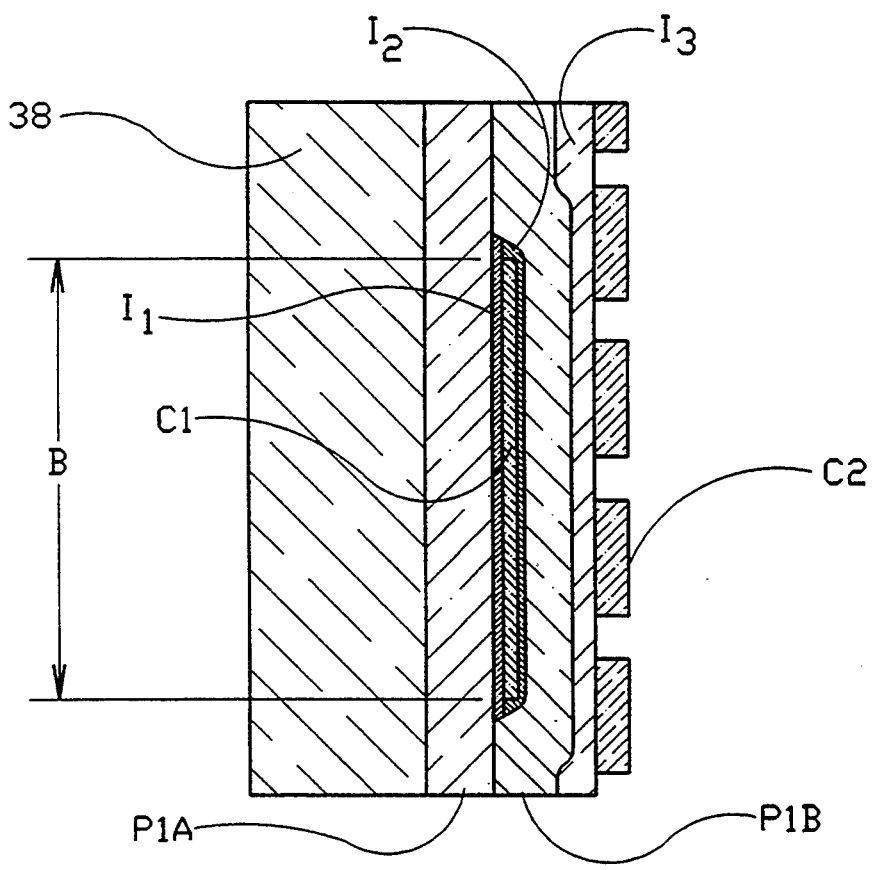
FIG. 4 is a partial cross sectional view of the present invention through plane 4—4 of FIG. 2A.

As best seen in FIG. 4, there is a shunt valve path on at least one side of the MR gap; preferably there are shunt valve paths on each side of the MR gap in the central section. MR drive conductor C1 is disposed between insulating layers I1, I2. When conductor C1 is energized (during reading), it serves to magnetically saturate layers P1A and P1B over a length B. When conductor C1 is not energized (during writing), members P1A and P1B are not saturated so that write flux bypasses MR element 31. Thus, MR drive conductor C1 also serves as the shunt valve control. Drive currents for MR elements are typically of the order of 10 to 15 mA, which is sufficient to saturate a "valve gap" (length B in FIG. 4) of about 10 $\mu$m.

Figure 5:
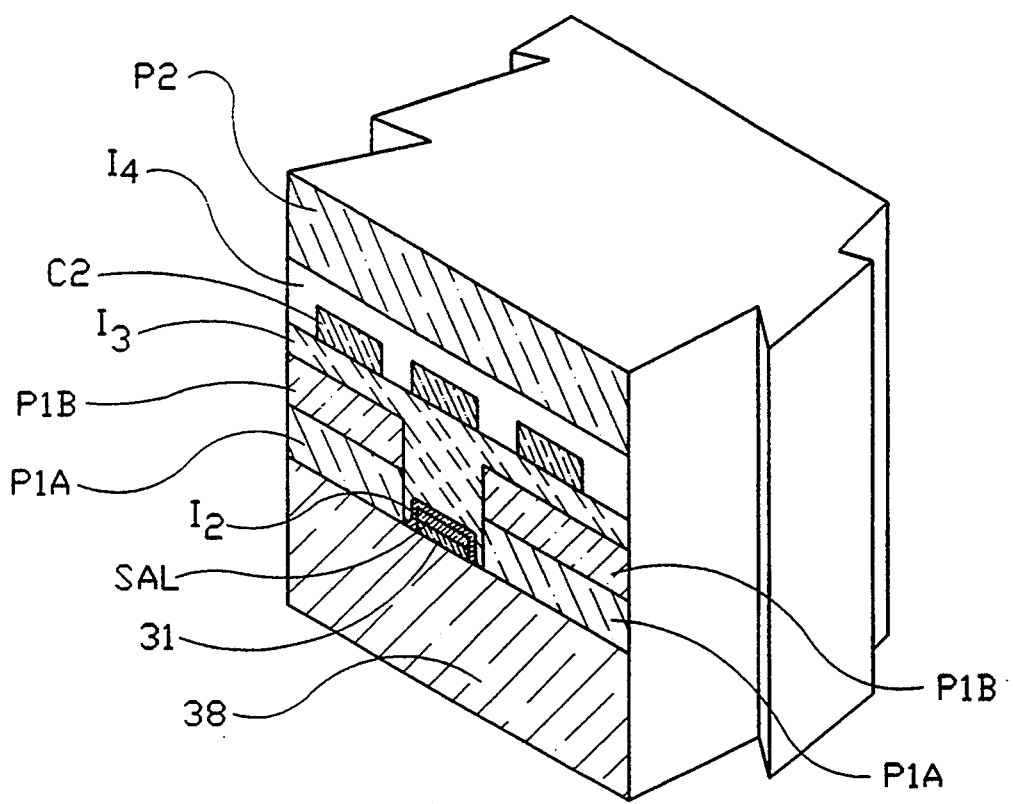
FIG. 5 is a partial isometric view showing the cross sectional configuration of the complete transducer corresponding to FIG. 3.

The partial isometric cross sectional view of FIG. 5 shows the transducer assembly including layers P1A, P1B and P2, MR sensor 31, write conductors C2 and the various insulating layers. FIG. 5 also shows a substrate 38 on which the transducing elements are mounted.

Figure 6:
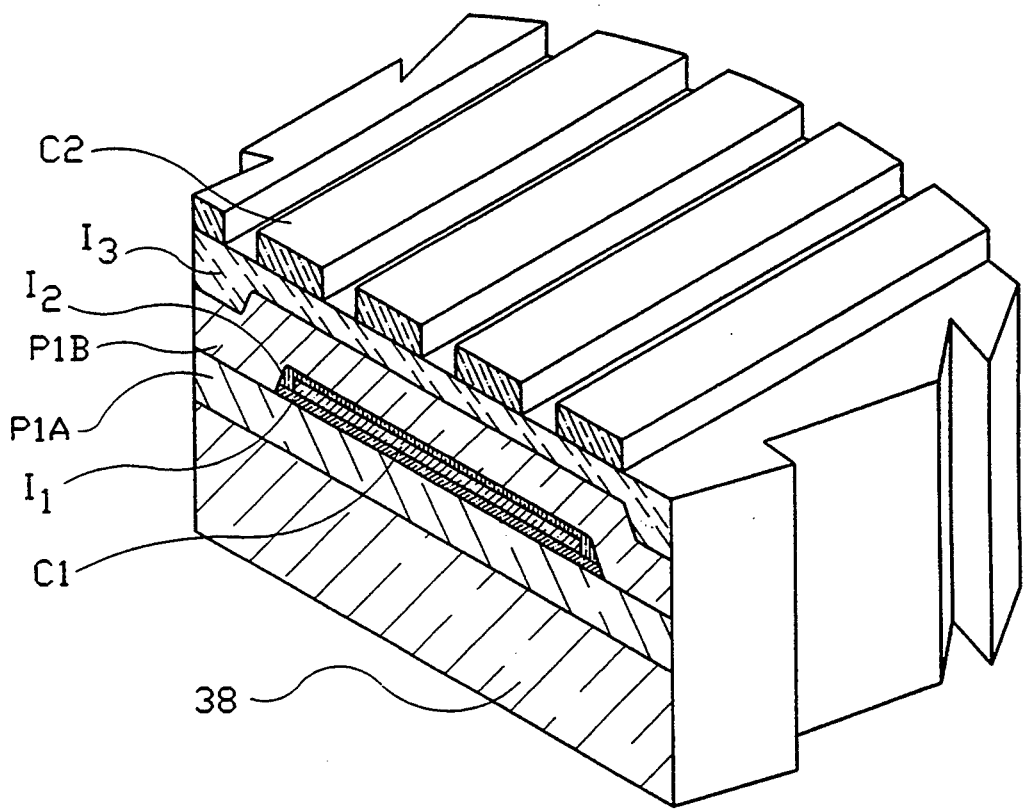
FIG. 6 is a partial isometric view showing another view corresponding to the cross-section of FIG. 4.

Similarly, the partial isometric cross sectional view of FIG. 6 illustrate the position of write conductors C2 and the relationship of the shunt valve of length B to control the saturation of layers P1A and P1B.

The read efficiency of the present device is determined by the ratio B/A, which can be made to equal 4 to 5, and by the ratio of transducer-gap reluctance to MR-gap reluctance, $R_g/R_{MR}$. T. Maruyama et al., in "A Yoke Magnetoresistive Head For HighTrack Density Recording", IEEE Trans. Magnetics, vol. 23, p. 2503 (1987), reported signals of 80 $\mu$v p-p per $\mu$m of track width, obtained with a yoke-type MR head (without a magnetic valve) with $R_g/R_{MR} \approx 1$, using a CoNiP medium with a 700-A° thickness and a head-to-medium spacing of 10 $\mu$". However, ratios of $R_g/R_{MR} \approx 3$ can be achieved with current fabrication techniques.

In the two shunt paths of the present invention, the direction of flux propagation is not parallel to the hard axis of magnetization, but this does not affect the operation, since the shunt paths are only used for writing.

Figures 7A, 7B:
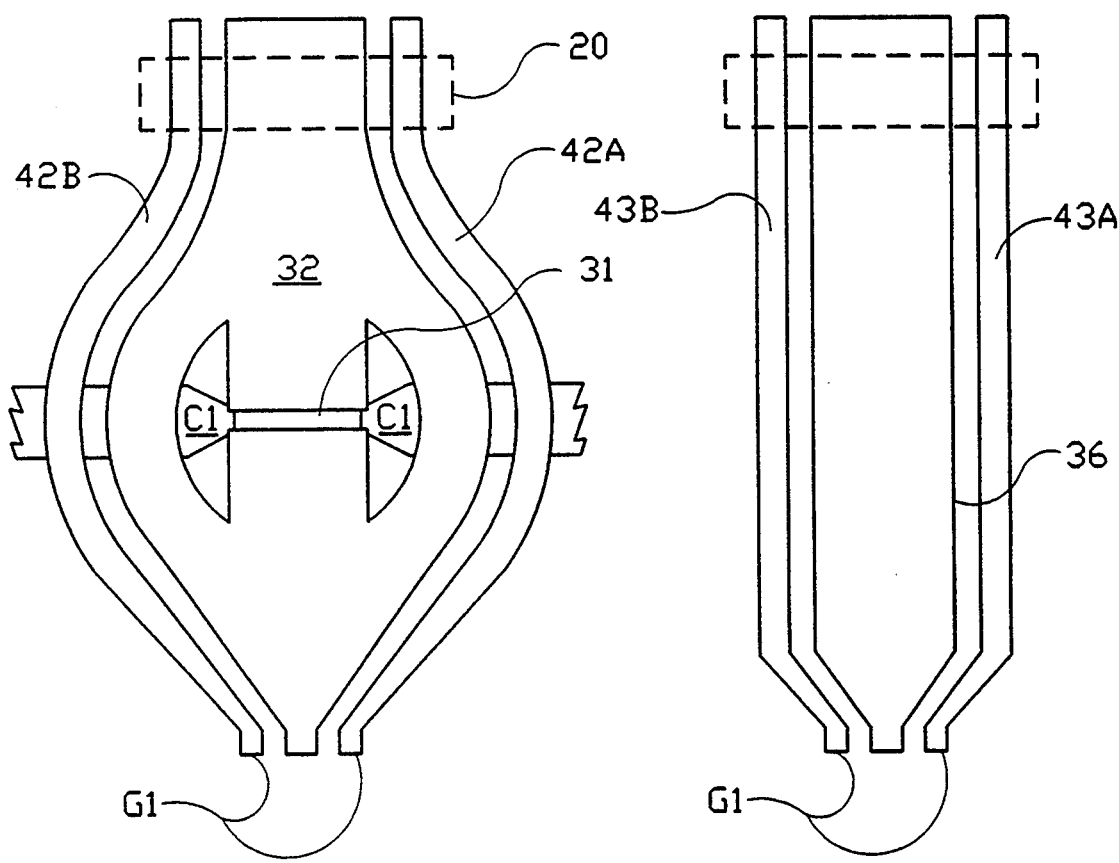
FIGS. 7A and 7B are plan views of an alternate embodiment of the invention utilizing a wide-write, narrow-read structure.

FIGS. 7A and 7B show an embodiment of the invention with a wide write transducing gap and a narrow read transducing gap. The structure of FIGS. 7A and 7B is essentially similar to that described above except for the addition of magnetic outrigger members 42A, 42B on the P1 structure 32 spaced from the main structure of the P1 and P2 layer. Similarly, the P2 structure of FIG. 7B has outrigger members 43A, 43B spaced from the P2 structure. The P1 outrigger members 42A, 42 form a write transducing gap G1 with the P2 outrigger members 43A, 43B at their lower ends and on either side of the read transducing gap formed by layers 32 and 36 to form a wide write, narrow read structure.

The present invention has the advantage over the structure of the above identified U.S. Pat. No. 5,255,141 that it requires three less layers (One P layer, one I layer, one C layer).

The present invention has the following advantages over conventional (shielded) MR read-write heads:

1. It requires one less layer (exchange layer); no exchange layer is needed, because the MR element is as long as the yoke is wide, and long MR elements have low Barkhausen noise.

2. Further simplification of the fabrication process. In the conventional MR head, the MR read transducer must be carefully aligned with the write section of the head. This requirement does not exist in the device of this invention.

3. Higher spatial resolution because the gap length can be made smaller than in a conventional MR head.

4. No thermal noise spikes, which are generated when the head makes contact with asperities protruding from the medium surface.

5. No accessing problems with rotary actuators, which can arise when a conventional MR read transducer is combined with an inductive write head because of the separation between write and read gaps.

6. The signal does not have differentiated. It can be shown that the effect of intersymbol interference, adjacent-track pickup, media defects and external disturbances on the zero cross-overs of differentiated signals is about 6 times greater than their effect on undifferentiated signals.

What is claimed is:

1. A thin film read-write magnetic head comprising:

first and second adjacent planar magnetic layers forming a magnetic circuit path with a transducing gap, flux sensing means disposed in a second gap in the plane of one of said magnetic layers, magnetic valve member means disposed adjacent to and in direct contact with said flux sensing means, said valve member means being disposed in said plane of said one of said magnetic layers; and conductor means in direct contact with the ends of said flux sensing means to supply a driving current to the flux sensing means and magnetically coupled to said valve member means, said conductor means when energized applying a magnetic field to said valve member means to magnetically control said valve member means.

2. A magnetic head in accordance with claim 1 in which said flux sensing means is a magnetoresistive sensing member.

3. A magnetic head in accordance with claim 1 in which said flux sensing means is a Hall effect member.

4. A magnetic head in accordance with claim 1 wherein said magnetic valve member means includes a pair of magnetic valve members.

5. A magnetic head in accordance with claim 1, including means for applying a saturation current to said conductor means to enable said flux sensing means to read recorded signals.

6. A magnetic head in accordance with claim 1, including an electrical coil disposed between said first and second magnetic layers for conducting electrical signals during writing.

7. A thin film magnetic head for recording information on a magnetic medium and for reading the recorded information from the medium, said head comprising:

first and second adjacent magnetic planar layers forming a magnetic circuit path with a transducing gap;

flux sensing means disposed in a second gap in the plane of one of said magnetic layers;

magnetic valve members adjacent to and disposed on each side of said flux sensing means and in direct contact with said flux sensing means, said valve members being disposed in said plane of said one of said magnetic layers; and conductor means in direct contact with the ends of said flux sensing means to supply a driving current to the flux sensing means and magnetically coupled to said valve members, said conductor means when energized applying a magnetic field to said valve members during a reading operation to magnetically control said valve members.

8. A magnetic head in accordance with claim 7 in which said one of said magnetic layers has a central section and spaced outer sections disposed on either side of said central section, each of said outer sections having a magnetic valve member therein.

9. A magnetic head in accordance with claim 8 in which said flux sensing means is a magnetoresistive member.

10. A magnetic head in accordance with claim 8 in which said flux sensing means is a Hall effect member.

11. A magnetic head in accordance with claim 8 including:

a pair of spaced magnetic members disposed on either side of said outer sections and another pair of spaced magnetic members disposed on either side of a central section of the other magnetic layer, said spaced magnetic members of one layer forming with said spaced magnetic members of the other layer a transducing gap which provides a wider effective path during recording than during reading.

* * * * *